(12) United States Patent
Gueguen et al.

(10) Patent No.: US 10,839,564 B2
(45) Date of Patent: Nov. 17, 2020

(54) LEVERAGING JPEG DISCRETE COSINE TRANSFORM COEFFICIENTS IN NEURAL NETWORKS

(71) Applicant: Uber Technologies, Inc., San Francisco, CA (US)

(72) Inventors: Lionel Gueguen, Erie, CO (US); Alexander Igorevich Sergeev, Newcastle, WA (US); Ruoqian Liu, San Francisco, CA (US); Jason Yosinski, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 119 days.

(21) Appl. No.: 16/049,766

(22) Filed: Jul. 30, 2018

(65) Prior Publication Data

US 2019/0244394 A1 Aug. 8, 2019

Related U.S. Application Data

(60) Provisional application No. 62/628,179, filed on Feb. 8, 2018.

(51) Int. Cl.
*G06T 9/00* (2006.01)
*H04N 19/186* (2014.01)
*H04N 19/625* (2014.01)
*G06N 3/02* (2006.01)

(52) U.S. Cl.
CPC ............. *G06T 9/002* (2013.01); *G06N 3/02* (2013.01); *H04N 19/186* (2014.11); *H04N 19/625* (2014.11)

(58) Field of Classification Search
CPC ..... G06T 9/002; H04N 19/186; H04N 19/625; G06N 3/02
See application file for complete search history.

(56) References Cited

U.S. PATENT DOCUMENTS 9,832,474 B2 * 11/2017 Kim ................... H04N 19/103
2012/0045142 A1 * 2/2012 Demidov ............. H04N 19/40
382/246

OTHER PUBLICATIONS

Dodge, S., & Karam, L. (Jun. 2016). Understanding how image quality affects deep neural networks. In 2016 eighth international conference on quality of multimedia experience (QoMEX) (pp. 1-6). IEEE. (Year: 2016).*
Compressing deep neural nets, webpage: https://machinethink.net/blog/compressing-deep-neural-nets/ published: Sep. 2, 2017 (Year: 2017).*

(Continued)

*Primary Examiner* — Menatoallah Youssef
(74) *Attorney, Agent, or Firm* — Fenwick & West LLP

(57) ABSTRACT

A system classifies a compressed image or predicts likelihood values associated with a compressed image. The system partially decompresses compressed JPEG image data to obtain blocks of discrete cosine transform (DCT) coefficients that represent the image. The system may apply various transform functions to the individual blocks of DCT coefficients to resize the blocks so that they may be input together into a neural network for analysis. Weights of the neural network may be trained to accept transformed blocks of DCT coefficients which may be less computationally intensive than accepting raw image data as input.

20 Claims, 5 Drawing Sheets

(56) References Cited

OTHER PUBLICATIONS

Brock, A. et al., "Neural Photo Editing with Introspective Adversarial Networks," 5th International Conference on Learning Representations, Apr. 2017, pp. 1-15.
Deng, J. et al., "Imagenet: A Large-Scale Hierarchical Image Database," Computer Vision and Pattern Recognition, Jun. 2009, pp. 248-255.
He, K. et al., "Deep Residual Learning for Image Recognition," Dec. 10, 2015, pp. 1-12.
Hudson, G. et al., "JPEG at 25: Still going strong," IEEE MultiMedia, vol. 24, Iss. 2, Apr.-Jun. 2017, pp. 96-103.
Krizhevsky, A. et al., "Imagenet Classification with Deep Convolutional Neural Networks," Advances in Neural Information Processing Systems 25 (NIPS 2012), Dec. 2012, pp. 1106-1114.
Langley, P., "Crafting papers on machine learning," Proceedings of the 17th International Conference on Machine Learning (ICML 2000), Jun.-Jul. 2000, pp. 1207-1216.
Lecun, Y. et al., "Gradient-Based Learning Applied to Document Recognition," Proceedings of the IEEE, vol. 86, No. 11, Nov. 1998, pp. 2278-2324.
"Libjpeg-turbo," two pages, Feb. 7, 2019, [Online] [Retrived on May 13, 2019] Retrieved from the Internet <URL: https://libjpeg-turbo.org/>.
Liu, S. et al., "Efficient DCT-Domain Blind Measurement and Reduction of Blocking Artifacts," IEEE Transactions on Circuits and Systems for Video Technology, vol. 12, Iss. 12, Dec. 2002, pp. 1139-1149.
Sergeev, A. et al., "Meet Horovod: Ubers Open Source Distributed Deep Learning Framework for Tensorflow," 11 psges, Oct. 17, 2017, [Online] [Retrieved on May 13, 2019] Retrieved from the Internet <URL: https://eng.uber.com/ horovod/>.
Sourceforge, "libjpeg," one page, 2018, [Online] [Retrieved on May 13, 2019] Retrieved from the Internet <URL: http://libjpeg.sourceforge.net>.
Srom, M. "GPUJPEG," five pages, 2018, [Online] [Retrieved on May 13, 2019] Retrieved from the Internet <URL: https://github.com/hoopoe/gpujpeg>.
Wikipedia, "Barns grand tetons YCbCr seperation—YCbCr," two pages, Dec. 26, 2006, [Online] [Retrieved on May 13, 2019] Retrieved from the Internet <URL: https://en.wikipedia.org/wiki/YCbCr#/media/File:Barns_grand_tetons_YCbCr_ separation.jpg>.
Wikipedia, "JPEG," 29 pages, date unknown, [Online] [Retrieved on May 13, 2019] Retrieved from the Internet <URL: https://en.wikipedia.org/wiki/JPEG>.
Yosinski, J. et al., "Understanding Neural Networks Through Deep Visualization," Deep Learning Workshop, 31st International Conference on Machine Learning (ICML), 2015, pp. 1-12.

* cited by examiner

LEVERAGING JPEG DISCRETE COSINE TRANSFORM COEFFICIENTS IN NEURAL NETWORKS

CROSS-REFERENCE TO RELATED APPLICATIONS

This application claims the benefit of U.S. Provisional Application No. 62/628,179, filed Feb. 8, 2018, which is incorporated by reference in its entirety.

BACKGROUND

Field of Art

This disclosure relates generally to image processing, and in particular to using neural networks to analyze partially decompressed image files.

Description of Art

Compression techniques, such as the Joint Photographic Experts Group (JPEG) standard are frequently incorporated into processes for generating, storing, transmitting, and displaying images. Many digital cameras employ compression techniques to save memory space. Such compressed images are later decompressed before they can be viewed or processed.

The compression process for JPEG and other lossy compression formats irretrievably drops some image data each time an image is compressed. Images saved in a JPEG format are decompressed prior to image processing, losing image data. The results of such image processing may be compressed again prior to storage or transmittal, leading to a further loss of data.

Another difficulty that often arises with image processing is the computational complexity of the processing techniques. For example, neural networks used to classify images and to identify content within images may include many logical layers to account for the size and complexity of images. Computing time and resources that are needed to apply a neural network to an image do not always scale well. Consequently, it can be beneficial to reduce the number of logical layers included in a neural network without sacrificing the accuracy of the output.

SUMMARY

A method of image analysis reduces the number of logical layers needed for a neural network to analyze an image while also limiting an amount of decompression that needs to be performed to analyze an image the image. To generate a classification or prediction about a compressed image, a system first partially decompresses the image. In the case of a JPEG encoded image (e.g., in one embodiment), partial decompression includes decoding a set of Huffman encodings to obtain blocks of discrete cosine transform (DCT) coefficients that represent the image.

Color images may be represented by three blocks of DCT coefficients. Typically, one block of DCT coefficients represents brightness, and the two other blocks represent color. Image compression schemes sometimes store different blocks of DCT coefficient data at different resolutions. For example, the system may store luma (that is, brightness) information at a higher resolution than that at which it stores chroma (that is, color) information. Accordingly, the system may apply one or more transform functions to the blocks of DCT coefficients to normalize the sizes of the three blocks.

The transformed blocks of DCT coefficients are concatenated and provided as inputs to a neural network. The neural network generates a classification or a set of likelihood values for the image data. Since the neural network is provided with DCT coefficient information rather than raw image data, it may be modified to skip or otherwise alter initial logical steps involved in the classification, which can save computing time and resources.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

A system performs image processing using a neural network that accepts partially compressed images as input. Although many examples described herein relate to compressed images and convolutional neural networks, such a system could be used to analyze a variety of data formats using different compression standards and neural network architectures.

The system receives a compressed image for analysis. For example, the image may be compressed according to a Joint Photographic Experts Group (JPEG) compression standard. Rather than decompressing the image file completely prior to analysis, the system only partially decompresses the image into sets of discrete cosine transform (DCT) coefficients, also referred to as the quantized DCT values. For a color image, the decompression process may include applying a decoding algorithm (e.g., using Huffman codes) to convert the compressed image file into three DCT values, including one for a luma component and two for chromatic components of the image.

The system uses the DCT values in place of one or more initial layers of a neural network. Chromatic components of the compressed image often have different dimensions from the luma component. As a result, the system applies transform functions to the quantized DCT values to match the dimensions of the data sets spatially. The resulting blocks of data are concatenated and provided as input to a neural network to produce a classification of the image.

Figure 1:
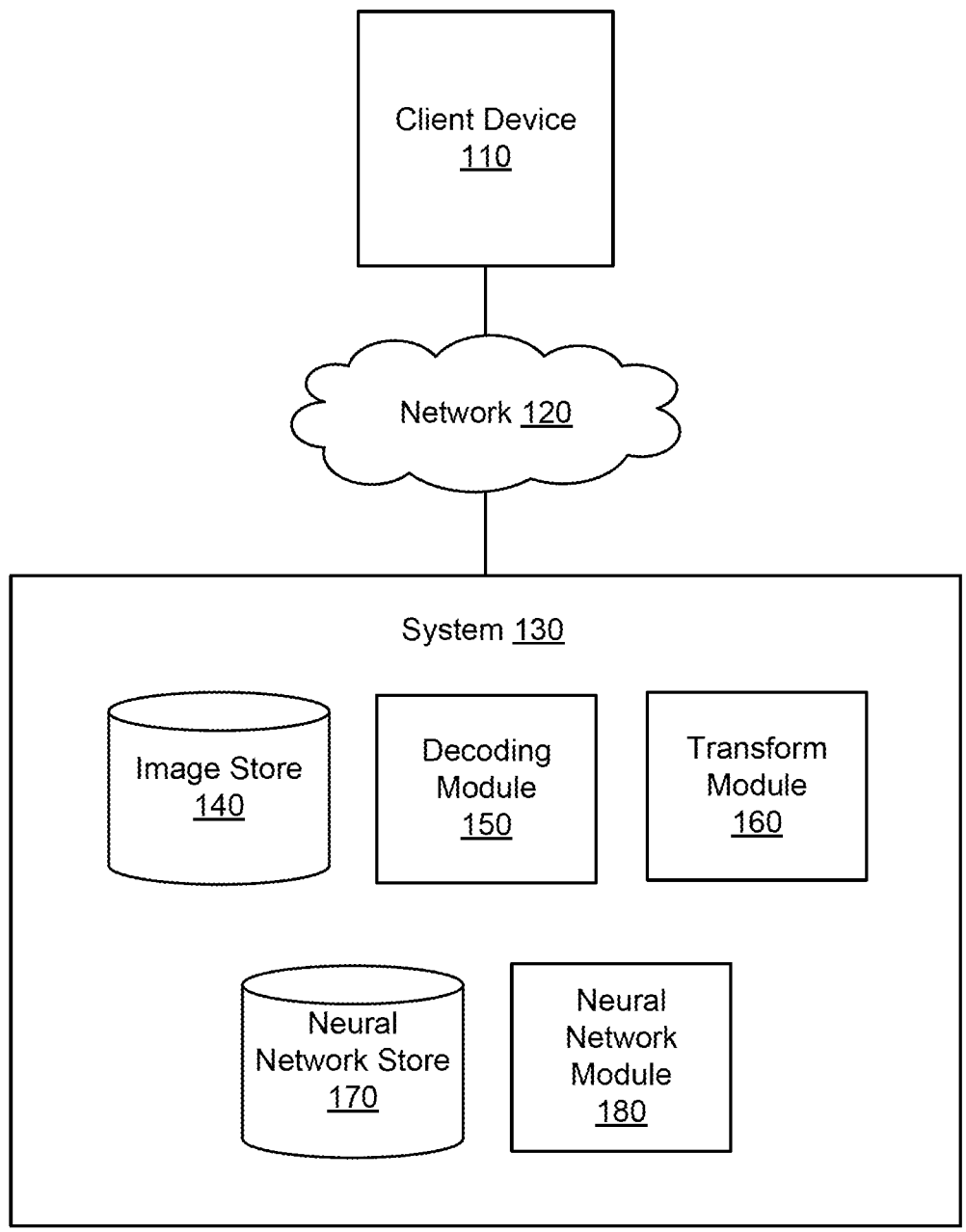
FIG. 1 is a high-level block diagram of a system architecture of a system, in accordance with an embodiment.

FIG. 1 is a high-level block diagram of a system architecture, in accordance with an embodiment. The system 130 performs image analysis on partially decompressed images using neural networks. Example embodiments are described in the context of JPEG images. However, variations of the methods may be performed using other compression formats that use discrete cosine transforms to compress data.

In the example shown in FIG. 1, a system environment includes a client device 110, a network 120, and the system 130. Although only one client device 110 is shown in FIG. 1, alternate embodiments of the system environment can have any number of client devices 110. The functions performed by the various entities of FIG. 1 may vary in different embodiments.

Client devices may be image capture devices and personal or mobile computing devices, such as cameras, smartphones, tablets, and computers. A client device 110 may facilitate image compression or image capture. In alternate embodiments, the client device 110 may not capture images, but may store images and image data. The system 130 may be a component of the client device 110 in some cases. In other embodiments, the client device 110 communicates with the system 130 over a network 120.

The network 120 may comprise any combination of local area and wide area networks employing wired or wireless communication links. In some embodiments, all or some of the communication on the network 120 may be encrypted.

The system 130 includes various modules and data stores that may be used for image compression, image decompression, and image analysis. The system 130 includes an image store 140, a decoding module 150, a transform module 160, a neural network store 170, and a neural network module 180. Computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 1, and the functionality of the components as described herein may be distributed differently from the description herein. Furthermore, the components of the system 130 can be included, additionally or alternatively in any suitable component shown in FIG. 1.

The image store 140 stores image data. The image data stored in the image store 140 may include compressed images, partially decompressed image data, and image analysis data, for example, as may be output by a neural network after image analysis. In some embodiments, the image store 140 may receive raw or compressed images for storage, for example, from a client device 110 via the network 120. In some embodiments, the system 130 may compress raw images before storing them in the image store 140.

The decoding module 150 partially decompresses the compressed image data. For images stored using JPEG encoding, the decoding module 150 decodes channels of Huffman codes from the compressed image to obtain blocks of DCT coefficients representing components of the compressed image.

The transform module 160 applies transform functions to the quantized DCT values generated by the decoding module 150. The different blocks of the decoded quantized DCT values may have differing spatial dimensions. Human eyesight tends to be more sensitive to variations in brightness than to chromatic variations. Accordingly, image compression schemes may drop values related to chroma components of an image more frequently than they drop values related to image brightness without significantly altering the reconstructed image. This can result in blocks of DCT coefficients that represent color having smaller dimensions than a corresponding block of DCT coefficients that represent brightness for the image. The transform module 160 performs transforms of the DCT components until they all have the same dimensions and can thus be concatenated for input into a neural network. Some examples of transform functions that may be applied by the transform module 160 are described in FIG. 3A and FIG. 3B.

The neural network store 170 stores trained weights for one or more neural networks. In some embodiments, the system 130 may support a variety of image analysis techniques. To support the image analysis, the neural network store 170 may include weights for neural networks that are trained to produce different kinds of classifiers and confidence values related to the input image data.

The neural network module 180 accesses a neural network from the neural network store and uses the neural network to analyze the image data. The neural network module 180 provides the transformed blocks of quantized DCT values generated by the transform module 160 as input to the neural network. A confidence or classification is generated by the neural network, for example, to identify areas of interest in the image or to determine whether the image includes a certain type of object. In some embodiments, the confidence or classification data is saved by the system 130 for later use, for example, the data about the image may be saved in the image store 140.

Figure 2:
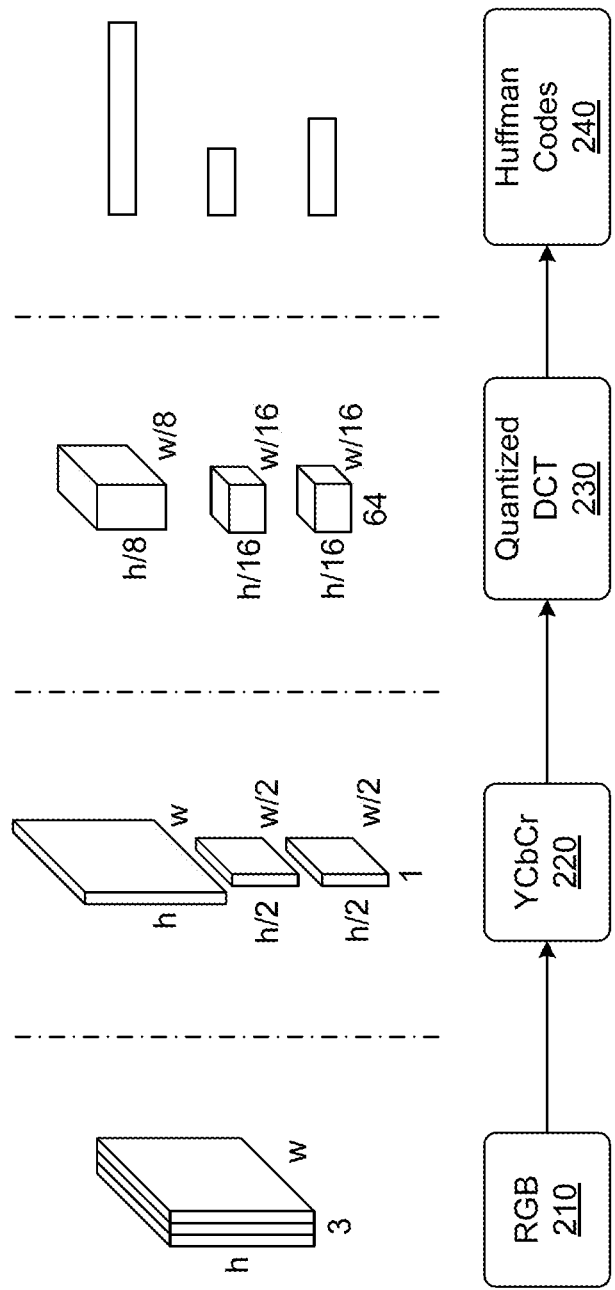
FIG. 2 illustrates an encoding process, in accordance with an embodiment.

FIG. 2 illustrates an encoding process, in accordance with an embodiment. In particular, the example of FIG. 2 demonstrates a process for compressing an image using JPEG encoding. Pixels of a color image are represented digitally by red, green, and blue (RGB) components 210. Thus the digital image data may be thought of as a block with height and width of the original image (e.g., measured in pixels), and with a depth of three, wherein each of the three layers includes values for one of the red, green, and blue image components.

The RGB 210 representation of the image is converted into a YCbCr representation 220. YCbCr is a color space that is sometimes used instead of the RGB color space to represent color image data digitally. The YCbCr representation of the image data represents the image as a luma (i.e., brightness) component (Y) and two chromatic components (Cb, Cr). The luma component represents brightness within an image, and the chromatic components represent colors. Since human eyesight is more sensitive to differences in brightness than differences in colors, the chroma components may be subsampled to a lower resolution than the luma component, reducing the size of the image data. For example, in FIG. 2, the YCbCr representation 220 of the image data includes a full resolution brightness component and two chroma components with halved height and width dimensions with respect to the original image size.

The three channels (luma, chroma, and chroma) are projected through a discrete cosine transform (DCT) and quantized. The resulting quantized DCT values 230, which represent blocks of DCT coefficients, are compressed further into Huffman codes 240 to produce the compressed JPEG image. Unlike the YCbCr and DCT transformations, which may irreversibly lose some image data, the Huffman encoding is a lossless step from which the same quantized DCT 230 values can be retrieved through a decoding process.

Figure 3A:
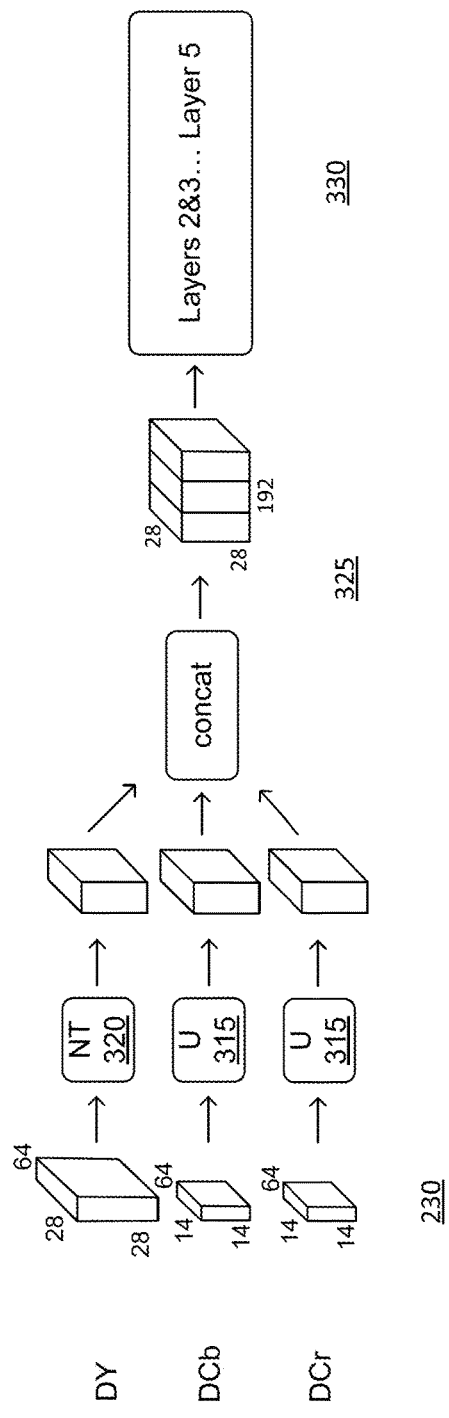
FIG. 3A illustrates a process for providing partially decoded values as input to a neural network, in accordance with an embodiment.

FIG. 3A illustrates a process for providing partially decoded values as input to a neural network, in accordance with an embodiment. The process shown in FIG. 3A illustrates one possible set of transformations that may be applied by the transform module 160 and analysis that may be done by the neural network module 180. Three blocks of DCT coefficients 230 correspond to the luma, and chroma components of the compressed image. The three blocks of DCT coefficients 230 are obtained from compressed data of an image by the decoding module 150 which decodes the Huffman encoding of a JPEG image. As in the example of FIG. 3A, the luma component ($D_Y$) may comprise a larger block of DCT coefficients than the chroma components ($D_{Cb}$ and $D_{Cr}$). Given that the DCT coefficients 230 from the luma channel form a differently sized block of data than those of the chroma channels, transformation functions may be applied to some or all of the blocks of DCT coefficients 230 to match the spatial dimensions of the blocks of DCT coefficients 230.

In one embodiment, as depicted in FIG. 3A, the DCT coefficients 230 of the chroma channels are upsampled 315 so that their dimensions match those of the DCT coefficients of the luma channel. No transformation 320 is applied to the DCT coefficients 230 of the luma channel in this case.

The resulting blocks are concatenated 325. The concatenated data is provided to the neural network module 180, which uses the three concatenated data layers as input to a neural network 330 to produce a likelihood or classification value. In the example of FIG. 3A, the neural network 330 applied by the neural network module 180 is a modified convolutional neural network from which initial layers of the neural network are removed since the network is trained to accept transformed blocks of DCT coefficients rather than raw image data.

Figure 3B:
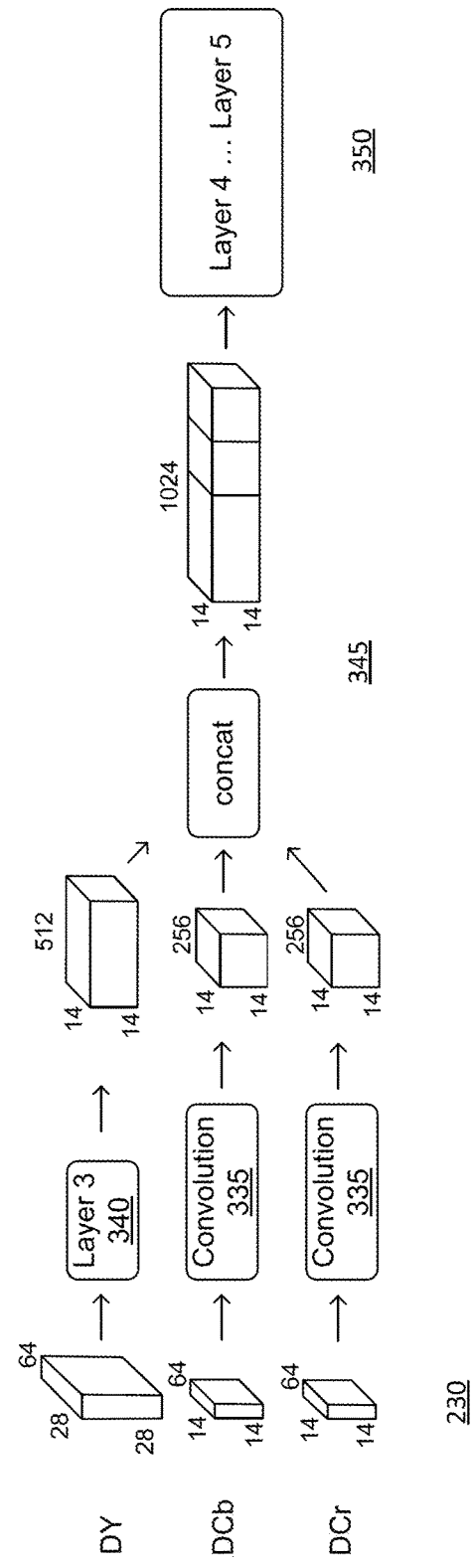
FIG. 3B illustrates another process for providing partially decoded values as input to a neural network, in accordance with an embodiment.

FIG. 3B illustrates another process for providing partially decoded values as input to a neural network, in accordance with an embodiment. The example process of FIG. 3B also begins with three blocks of DCT coefficients 230 obtained from compressed image data by the decoding module 150. Instead of upsampling the chroma coefficients, as in the process of FIG. 3A, convolution layers 335 are applied to the blocks of DCT coefficients 230 of the chroma channels while an initial layer of a neural network is applied to the blocks of DCT coefficients 230 of the luma channel. In this case, the convolutions 335 applied to the DCT coefficients 230 of the chroma channels do not change the spatial dimensions of the data, while the neural network layer 340 that is applied to the DCT coefficients 230 of the luma channel outputs a block of data that is downsampled and matches the size of the data for each of the chroma components.

The resulting data from the three channels is concatenated 345. The concatenated data is provided to the neural network module 180, which, as in FIG. 3A, uses the concatenated data as input to a neural network 350 to generate a likelihood or classification value for the compressed image. In the example of FIG. 3B, the neural network 350 may have been trained to include fewer of the initial computational layers than the example neural network of FIG. 3A. As shown in FIG. 3A, one of the initial layers (e.g., layer 3) is already applied to the luma component during the transformation phase to resize the channels prior to concatenation.

In other embodiments, besides those illustrated in FIG. 3A and FIG. 3B, different transformations may be applied to one or more of the channels of DCT coefficients 230 to size and prepare them as inputs to a neural network. For example, rather than upsampling the chroma components, as shown in FIG. 3A, the chroma components may remain the same while the luma component is downsampled with a convolution layer.

Figure 4:
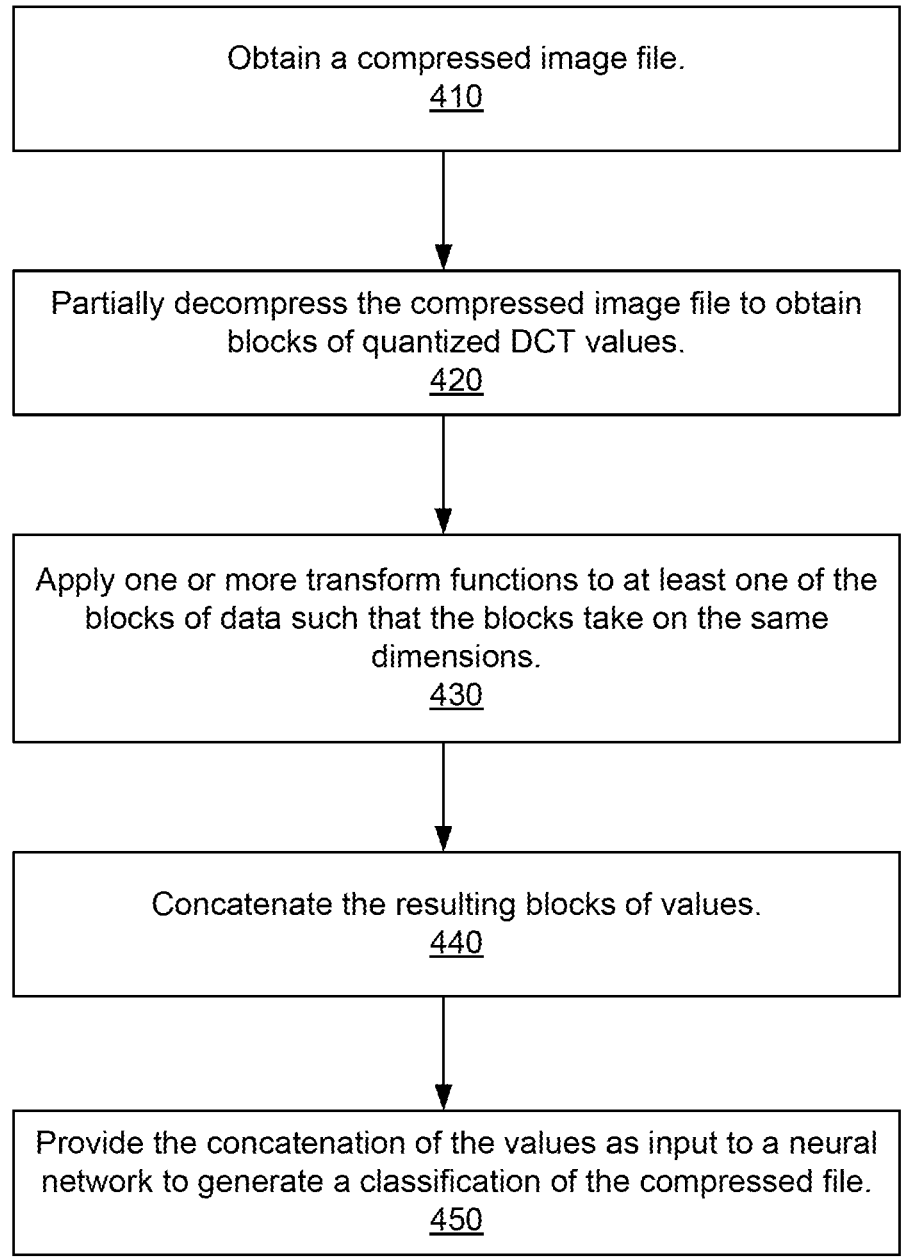
FIG. 4 is a flowchart illustrating a method of applying partially decoded values as inputs to a neural network, in accordance with an embodiment.

FIG. 4 is a flowchart illustrating a method of applying partially decoded values as inputs to a neural network, in accordance with an embodiment. The system 130 obtains 410 a compressed image file. To analyze the compressed image file, the system partially decompresses 420 the file to obtain blocks of quantized DCT coefficient values. For example, the system 130 may decode Huffman codes to obtain the DCT coefficients for luma and chroma components of the image.

The system applies 430 one or more transform functions to at least one of the blocks of DCT coefficients such that all of the blocks of DCT coefficients take on the same dimensions. In some embodiments, the transform functions may involve upsampling or downsampling of individual channels of DCT coefficients to match the dimensions. In one embodiment, the transformations may be layers of a neural network, such as upsampling convolutions, that are applied to some or all of the blocks of DCT coefficients.

The results from the application of the transform functions to the blocks of DCT coefficients are concatenated 440 and provided 450 as input to a neural network to generate a classification of the compressed image file.

Figure 5:
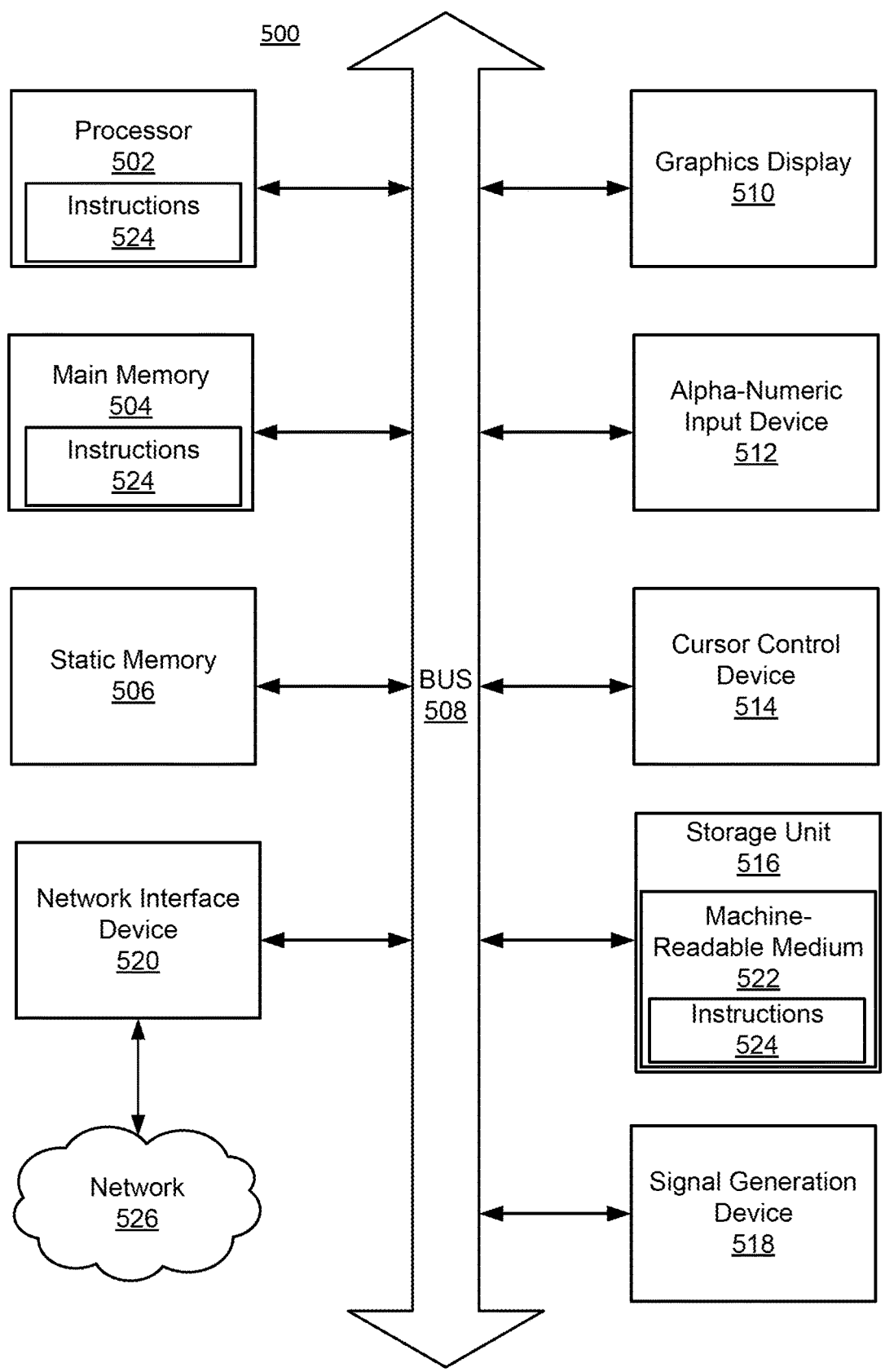
FIG. 5 is a block diagram illustrating components of an example machine for reading and executing instructions from a machine-readable medium, in accordance with an embodiment.

FIG. 5 is a block diagram illustrating components of an example machine able to read instructions from a machine-readable medium and execute them in one or more processors (or controllers). Specifically, FIG. 5 shows a diagrammatic representation of a system 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 506 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include instructions for implementing the functionalities of the decoding module 150, the transform module 160, or the neural network module 180. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   obtaining a compressed image file for analysis, wherein the compressed image file includes three channels of Huffman codes;
   decompressing the three channels of Huffman codes to obtain three blocks of quantized discrete cosine transform (DCT) values, wherein at least two of the blocks have differing dimensions;
   applying one or more transform functions to at least one of the three blocks of quantized DCT values, the one or more transform functions affecting the dimensions of the at least one of the three blocks such that the three blocks have the same dimensions;
   concatenating the resulting transformed three blocks of quantized DCT values; and
   providing the concatenation of the transformed blocks of quantized DCT values as input to a neural network to generate a classification of the compressed image file, the classification identifying areas of interest in the image or identifying whether the image includes a type of object.

2. The computer-implemented method of claim 1, wherein the compressed image file is compressed using the Joint Photographic Experts Group (JPEG) standard.

3. The computer-implemented method of claim 1, wherein the quantized values are discrete cosine transform (DCT) coefficients for a luma component (Y), a first chromatic component (Cb), and a second chromatic component (Cr) of the compressed image.

4. The computer-implemented method of claim 3, wherein applying one or more transform functions to at least one of the three blocks further comprises:
   upscaling the blocks representing the Cb and Cr components of the quantized DCT values to the same dimensions as the Y component of the quantized DCT values.

5. The computer-implemented method of claim 3, wherein applying one or more transform functions to at least one of the three blocks further comprises:
   applying a convolution to the blocks representing the Cb and Cr components of the quantized DCT values.

6. The computer-implemented method of claim 1, wherein applying one or more transform functions to at least one of the three blocks further comprises:

applying an initial logical layer of a second neural network to the block.

7. The computer-implemented method of claim 1, further comprising:
receiving raw image data for an image; and
compressing the raw image data using the Joint Photographic Experts Group (JPEG) standard.

8. A non-transitory computer-readable storage medium storing instructions that when executed by a computer processor perform actions comprising:
obtaining a compressed image file for analysis, wherein the compressed image file includes three channels of Huffman codes;
decompressing the three channels of Huffman codes to obtain three blocks of quantized discrete cosine transform (DCT) values, wherein at least two of the blocks have differing dimensions;
applying one or more transform functions to at least one of the three blocks of quantized DCT values, the one or more transform functions affecting the dimensions of the at least one of the three blocks such that the three blocks have the same dimensions;
concatenating the resulting transformed three blocks of quantized DCT values; and
providing the concatenation of the transformed blocks of quantized DCT values as input to a neural network to generate a classification of the compressed image file, the classification identifying areas of interest in the image or identifying whether the image includes a type of object.

9. The non-transitory computer-readable storage medium of claim 8, wherein the compressed image file is compressed using the Joint Photographic Experts Group (JPEG) standard.

10. The non-transitory computer-readable storage medium of claim 8, wherein the quantized values are discrete cosine transform (DCT) coefficients for a luma component (Y), a first chromatic component (Cb), and a second chromatic component (Cr) of the compressed image.

11. The non-transitory computer-readable storage medium of claim 10, wherein applying one or more transform functions to at least one of the three blocks further comprises:
upscaling the blocks representing the Cb and Cr components of the quantized DCT values to the same dimensions as the Y component of the quantized DCT values.

12. The non-transitory computer-readable storage medium of claim 10, wherein applying one or more transform functions to at least one of the three blocks further comprises:
applying a convolution to the blocks representing the Cb and Cr components of the quantized DCT values.

13. The non-transitory computer-readable storage medium of claim 8, wherein applying one or more transform functions to at least one of the three blocks further comprises:

applying an initial logical layer of a second neural network to the block.

14. The non-transitory computer-readable storage medium of claim 8, the actions further comprising:
receiving raw image data for an image; and
compressing the raw image data using the Joint Photographic Experts Group (JPEG) standard.

15. A computer system comprising:
a computer processor; and
a non-transitory computer-readable storage medium storing instructions that when executed by a computer processor perform actions comprising:
obtaining a compressed image file for analysis, wherein the compressed image file includes three channels of Huffman codes;
decompressing the three channels of Huffman codes to obtain three blocks of quantized discrete cosine transform (DCT) values, wherein at least two of the blocks have differing dimensions;
applying one or more transform functions to at least one of the three blocks of quantized DCT values, the one or more transform functions affecting the dimensions of the at least one of the three blocks such that the three blocks have the same dimensions;
concatenating the resulting transformed three blocks of quantized DCT values; and
providing the concatenation of the transformed blocks of quantized DCT values as input to a neural network to generate a classification of the compressed image file, the classification identifying areas of interest in the image or identifying whether the image includes a type of object.

16. The computer system of claim 15, wherein the compressed image file is compressed using the Joint Photographic Experts Group (JPEG) standard.

17. The computer system of claim 15, wherein the quantized values are discrete cosine transform (DCT) coefficients for a luma component (Y), a first chromatic component (Cb), and a second chromatic component (Cr) of the compressed image.

18. The computer system of claim 17, wherein applying one or more transform functions to at least one of the three blocks further comprises:
upscaling the blocks representing the Cb and Cr components of the quantized DCT values to the same dimensions as the Y component of the quantized DCT values.

19. The computer system of claim 17, wherein applying one or more transform functions to at least one of the three blocks further comprises:
applying a convolution to the blocks representing the Cb and Cr components of the quantized DCT values.

20. The computer system of claim 15, wherein applying one or more transform functions to at least one of the three blocks further comprises:
applying an initial logical layer of a second neural network to the block.

* * * * *